US009947149B2

(12) United States Patent
Bonhomme

(10) Patent No.: US 9,947,149 B2
(45) **Date of Patent: *Apr. 17, 2018**

(54) PROACTIVE DRIVER WARNING

(71) Applicant: Lytx, Inc., San Diego, CA (US)

(72) Inventor: Jerome Bonhomme, La Mesa, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,706

(22) Filed: May 3, 2016

(65) Prior Publication Data

US 2016/0275730 A1 Sep. 22, 2016

Related U.S. Application Data

(63) Continuation of application No. 14/500,732, filed on Sep. 29, 2014, now Pat. No. 9,373,257.

(51) Int. Cl.

| | |
|---|---|
| ***B60Q 1/00*** | (2006.01) |
| ***G07C 5/08*** | (2006.01) |
| ***G08G 1/0967*** | (2006.01) |
| ***G08G 1/01*** | (2006.01) |

(52) U.S. Cl.

CPC ......... *G07C 5/0816* (2013.01); *G08G 1/0112* (2013.01); *G08G 1/0129* (2013.01); *G08G 1/0141* (2013.01); *G08G 1/0967* (2013.01); *G08G 1/09675* (2013.01); *G08G 1/096716* (2013.01); *G08G 1/096775* (2013.01)

(58) Field of Classification Search

CPC .. G08G 1/0965; G08G 1/00; G08G 1/096716; G08G 1/096775; G08G 1/161; G08G 1/096741; G08G 1/162; G08G 1/096758; G08G 1/0112; G08G 1/0129; G08G 1/0141; G08G 1/04; G08G 1/096725; G08G 1/09675

USPC ...... 340/436, 905, 686.6, 568.1, 572.1, 540, 340/572.2–572.9

See application file for complete search history.

(56) References Cited

U.S. PATENT DOCUMENTS

| | | | | |
|---|---|---|---|---|
| 5,917,430 | A * | 6/1999 | Greneker, III | G01S 1/68 340/905 |
| 9,373,257 | B2 * | 6/2016 | Bonhomme | |
| 2004/0201672 | A1 * | 10/2004 | Varadarajan | H04N 7/183 348/148 |
| 2009/0097038 | A1 * | 4/2009 | Higgins-Luthman | B60G 17/019 356/602 |
| 2012/0280835 | A1 * | 11/2012 | Raz | G08G 1/0112 340/905 |
| 2013/0141251 | A1 * | 6/2013 | Sims | B60Q 9/008 340/905 |
| 2014/0191882 | A1 * | 7/2014 | Varma | G08G 1/096783 340/905 |

(Continued)

*Primary Examiner* — Daniel Previl
(74) *Attorney, Agent, or Firm* — Van Pelt, Yi & James LLP

(57) ABSTRACT

A system for warning a driver comprises an input interface and a warning determiner. The input interface is to receive a set of warnings, wherein a warning of the set of warnings is associated with a road segment and a set of conditions. The warning determiner is to determine that a current location matches the road segment associated with the warning and, in the event that it is determined to warn a driver based at least in part on the warning and the set of current conditions, to indicate to warn the driver.

18 Claims, 9 Drawing Sheets

(56) References Cited

U.S. PATENT DOCUMENTS

2015/0321605 A1* 11/2015 Mirza ........................ B60R 1/00
348/148

* cited by examiner

| Road Segment Index | Hard Driving Events | Out Of Control Events | Rough Road Events | Impact Events | Flat Tire Events |
|---|---|---|---|---|---|
| 1000 | 0 | 1 | 0 | 0 | 1 |
| 1001 | 0 | 0 | 0 | 0 | 0 |
| 1002 | 0 | 0 | 2 | 0 | 0 |
| 1003 | 2 | 0 | 0 | 13 | 7 |
| 1004 | 0 | 0 | 0 | 0 | 0 |
| 1005 | 14 | 4 | 8 | 0 | 0 |
| 1006 | 0 | 12 | 0 | 15 | 0 |
| 1007 | 0 | 0 | 1 | 0 | 0 |
| 1008 | 0 | 0 | 0 | 2 | 0 |
| 1009 | 1 | 0 | 0 | 0 | 0 |
| 1010 | 0 | 0 | 0 | 8 | 0 |
| 1011 | 0 | 1 | 0 | 0 | 3 |
| 1012 | 0 | 0 | 0 | 0 | 0 |
| 1013 | 6 | 9 | 0 | 5 | 4 |
| 1014 | 0 | 0 | 0 | 0 | 0 |
| 1015 | 7 | 0 | 0 | 0 | 0 |

250

Fig. 2B

PROACTIVE DRIVER WARNING

CROSS REFERENCE TO OTHER APPLICATIONS

This application is a continuation of U.S. patent application Ser. No. 14/500,732, issued as U.S. Pat. No. 9,373,257, entitled PROACTIVE DRIVER WARNING filed Sep. 29, 2014 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can be used to detect accidents, record accident details, etc.

BRIEF DESCRIPTION OF THE DRAWINGS

Various embodiments of the invention are disclosed in the following detailed description and the accompanying drawings.

FIG. 2B is a diagram illustrating an embodiment of a table of events.

DETAILED DESCRIPTION

Figure 1A:
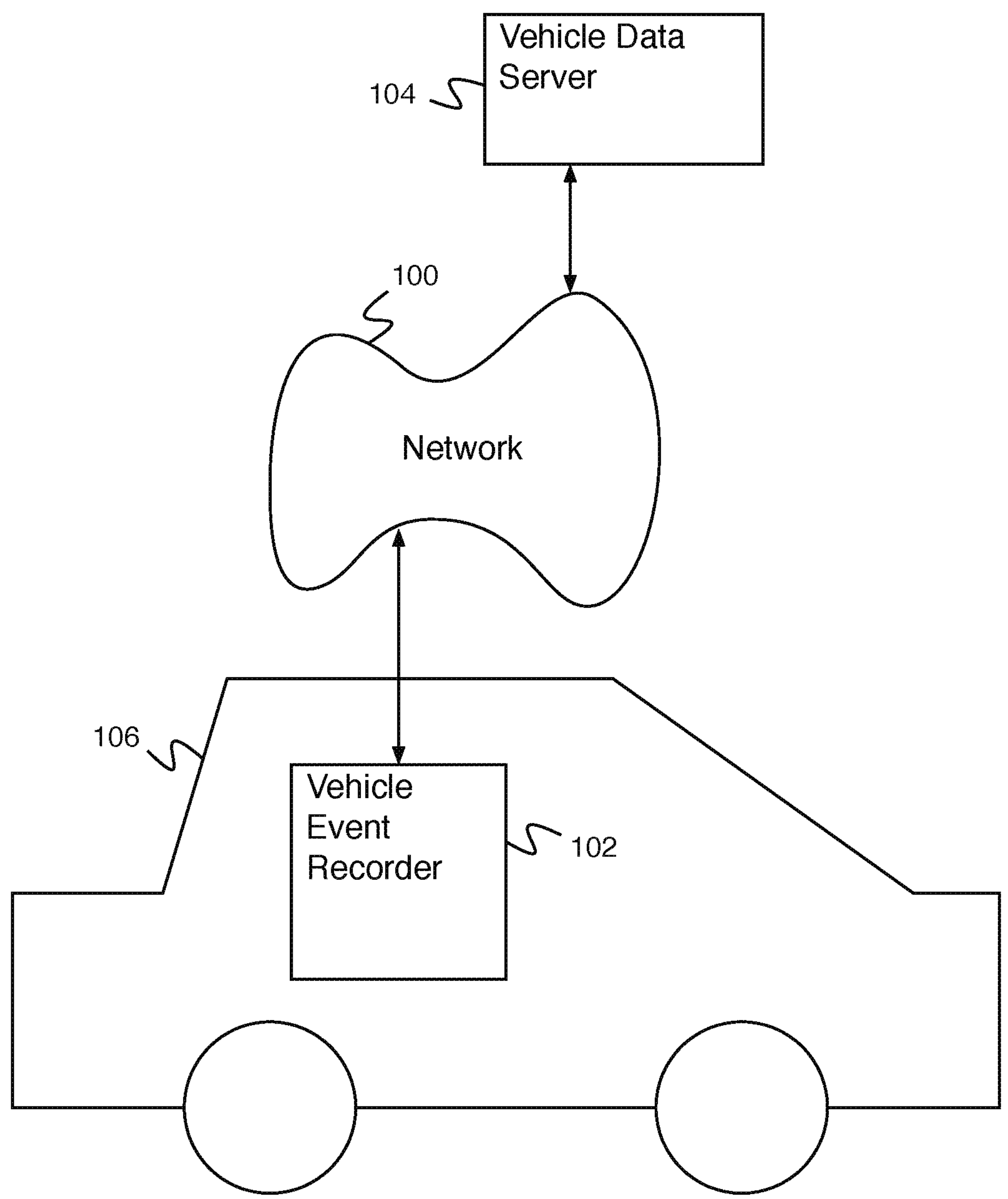
FIG. 1A is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for proactive driver warning is disclosed. A system for warning a driver comprises an input interface to receive a set of warnings including condition data from a warning database, wherein each warning is associated with a road segment; and a warning determiner to determine whether a current location matches a road segment associated with a warning; determine whether to warn a driver based at least in part on the warning and a set of current conditions; and indicate to warn the driver. The system for warning a driver additionally comprises a memory coupled to the processor and configured to provide the processor with instructions.

In some embodiments, a system for proactive driver warning comprises a vehicle data server (e.g., a centralized data server for the collection and distribution of vehicle data) and one or more vehicles each including vehicle event recorders (e.g., devices for sensing and recording anomalous vehicle events) in communication over a network. As anomalous vehicle events are detected by vehicle event recorders and uploaded to the vehicle data server, common anomalous events are identified. For example, a rough patch of road on a highway is found to commonly cause trucks above a certain weight to lose control when traveling at the speed limit. A driver would benefit to be warned about the rough patch of road prior to hitting it and losing control. Other similar road hazards include large potholes, dangerous mountain roads, roads under construction, etc. The system for proactive driver warning determines commonly detected anomalous events and conditions associated with the events (e.g., vehicle type, driver type, weather conditions, traffic conditions, etc.), and associates the events and conditions with road map segments (e.g., sections of road) where the events were determined to have occurred. The events are stored in a warning database. Periodically, a vehicle event recorder downloads a subset of the events in the warning database (e.g., the events associated with road segments on a driver's planned route). When the vehicle enters a new road segment, the vehicle event recorder determines whether there are any warnings associated with the road segment, and if so, the vehicle event recorder determines whether the conditions associated with the warning match the current conditions. In the event that the conditions match, the vehicle event recorder warns the driver of the upcoming potential hazard. In some embodiments, the vehicle event recorder warns the driver directly (e.g., via a light on its case, a display, an audible warning, etc.). In some embodiments, the vehicle event recorder warns the driver by providing a warning indication to an app on a mobile device operated by the driver.

FIG. 1A is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, cameras, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In some embodiments, event recorder 102 comprises a system for detecting road hazards. In some embodiments, event recorder 102 comprises a system for proactive driver warning. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a code division multiple access (CDMA) network, a global system for mobile (GSM) communication network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location.

Figure 1B:
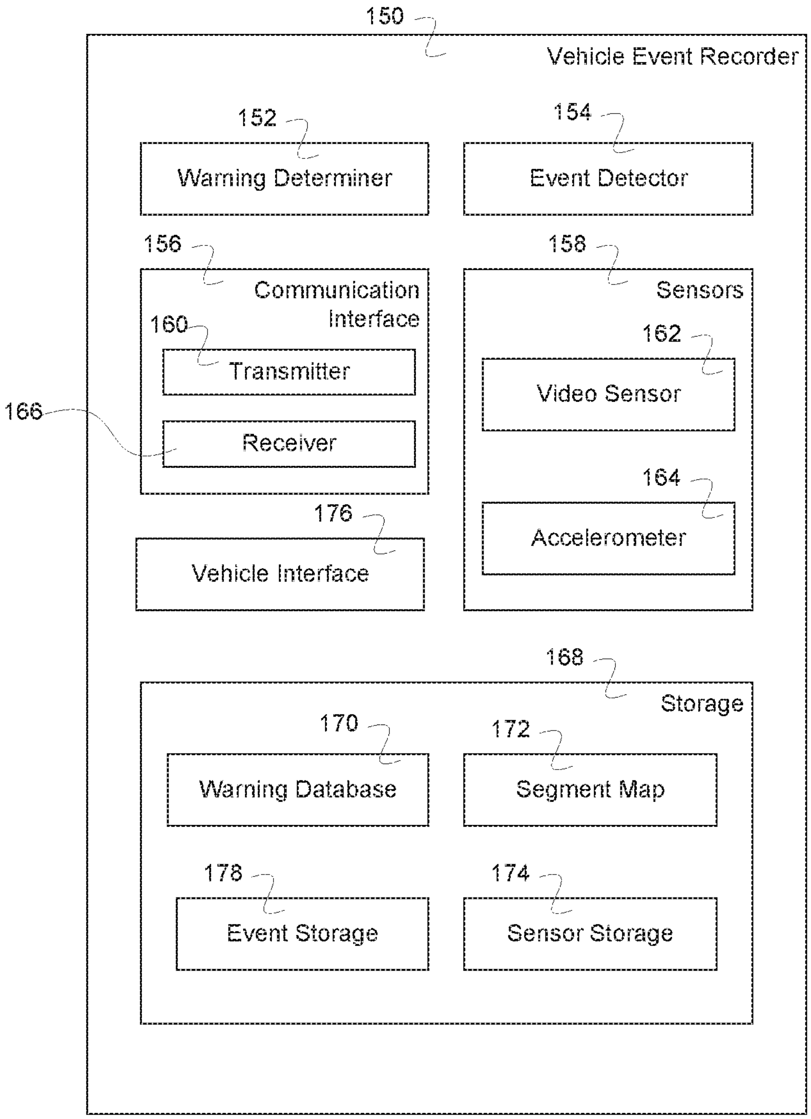
FIG. 1B is a diagram illustrating an embodiment of a vehicle event recorder.

FIG. 1B is a diagram illustrating an embodiment of a vehicle event recorder. In some embodiments, the vehicle event recorder of FIG. 1B is used to implement vehicle event recorder 102 of FIG. 1A. In the example shown, vehicle event recorder 150 comprises warning determiner 152, event detector 154, communication interface 156 (comprising transmitter 160 and receiver 166), sensors 158 (comprising video sensor 162 and accelerometer 164), vehicle interface 176, and storage 158 (comprising warning database 170, segment map 172, sensor storage 174, and event storage 178). Vehicle event recorder 150 processes sensor data from vehicle sensors via vehicle interface 176 and from internal sensors 158 comprising video sensor 162 and accelerometer 164. Event detector 154 determines events based on the sensor data and stores events in event storage 178. Events are transmitted via transmitter 160 of communications interface 156 to a server. Server determines warnings based on multiple vehicle event recorder events. Warnings are received using receiver 166 of communications interface 156. Warnings include associated conditions information as well as associated road segment. Warnings are stored in warning database 170. Warning determiner 152 determines whether or not to indicate a warning based on position information, stored warnings, and conditions associated with the warnings. In the event that the position is on a segment with an associated warning and conditions match the warning conditions then an indication to warn the driver is indicated. In various embodiments, position information is determined using sensors 158 (e.g., a GPS as included in sensors) or using a vehicle sensor (e.g., GPS or other position information received via vehicle interface 176). In various embodiments, a condition of the set of conditions comprises one of the following: a vehicle type, a driver identifier, a driver type, a time of day, a location, a weather condition, a traffic condition, or any other appropriate condition. In various embodiments, warning determiner 152, event detector 154, a sub-component of vehicle event recorder 150, or any other portion of vehicle event recorder 150 are implemented using a processor and instructions stored in a memory, where the memory is able to provide the processor with instructions.

In some embodiments, the indication to warn a driver is received and triggers activation of an indication to a user. For example, the indication to the user uses a feedback mechanism or User Interface (UI) that is a part of the Video Event Recorder or is a part of a different device (e.g., a phone, a mobile communication device, etc.) perhaps using an application running on the device.

Figure 2A:
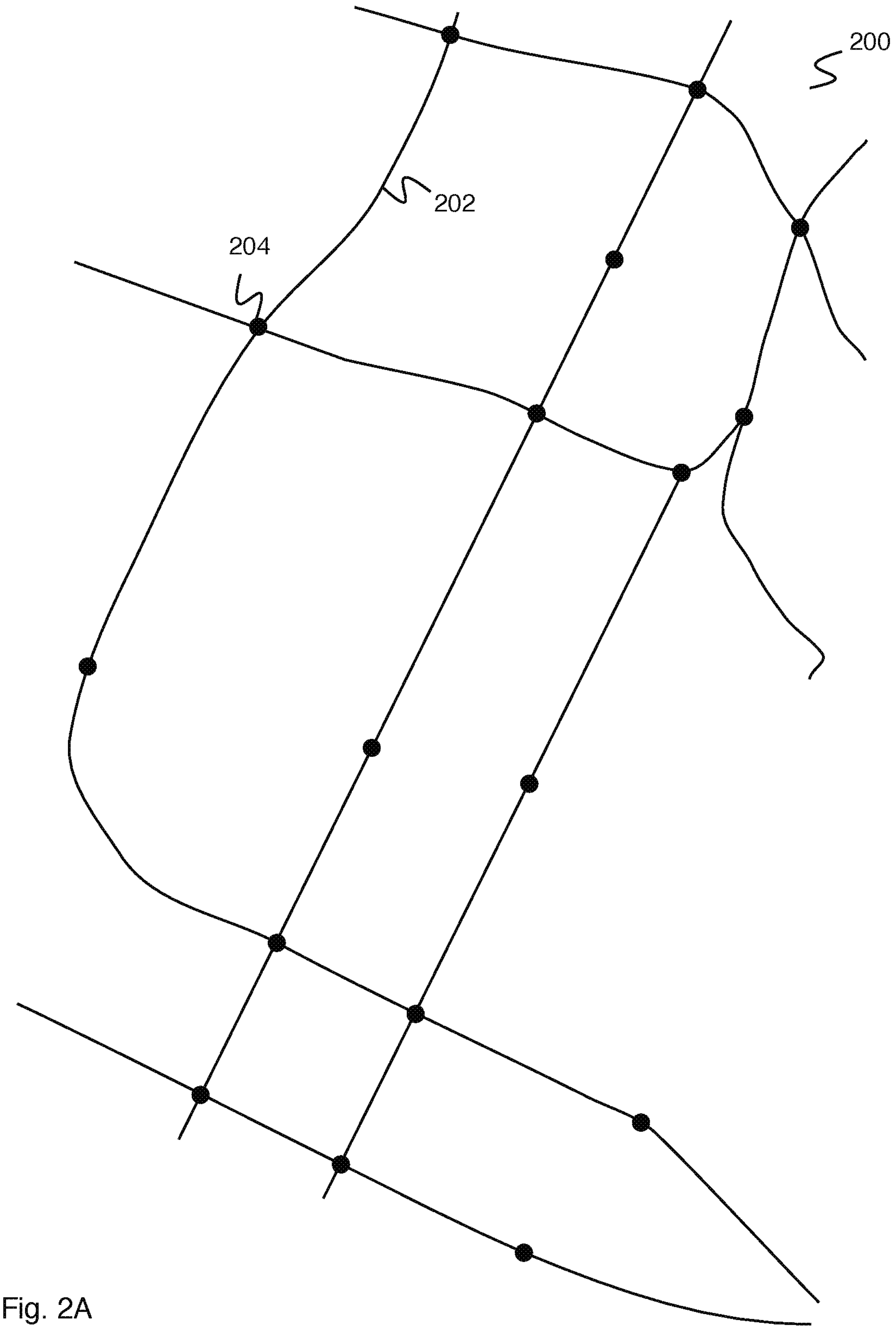
FIG. 2A is a diagram illustrating an embodiment of a road segment map.

FIG. 2A is a diagram illustrating an embodiment of a road segment map. In some embodiments, road segment map 200 is stored by a vehicle event recorder (e.g., vehicle event recorder 102 of FIG. 1). In some embodiments, road segment map 200 is stored on a vehicle data server (e.g., vehicle data server 104). In some embodiments, road segment map 200 is stored on a combination of a vehicle event recorder and a vehicle data server. In the example shown, road segment map 200 comprises road segments (e.g., road segment 202). In some embodiments, road segments comprise distinct regions of road. In some embodiments, a current road segment (e.g., a road segment that a vehicle is located within) is identified using global positioning systems (e.g., GPS) or other sensors. In some embodiments, a road segment has an associated road segment index (e.g., an identifier for identifying the road segment). In various embodiments, information is stored associated with a road segment including one or more of the following: legal information, speed limit information, road type information, road quality information, associated warnings (e.g., recommended speed limit warnings, rough road warnings, pothole warnings, condition associated information for a warning), or any other appropriate information. In some embodiments, warnings associated with road segments comprise associated conditions (e.g., vehicle type, driver type, weather, traffic, etc.). Road segment map 200 additionally comprises road segment endpoints (e.g., road segment endpoint 204). In some embodiments, when a vehicle crosses a road segment endpoint and enters a new road segment, associated information and warnings are received (e.g., from a vehicle event recorder storage, from a vehicle data server, etc.). In some embodiments, when warnings associated with a new road segment are received after crossing a road segment endpoint, conditions associated with the warning are evaluated to determine whether to warn the driver. In the event that the current conditions match the conditions associated with a warning, the driver is warned (e.g., an indication is provided to a driver).

FIG. 2B is a diagram illustrating an embodiment of a table of events. In some embodiments, event table 250 comprises a table of events reported by one or more vehicle event recorders (e.g., vehicle event recorder 102 of FIG. 1) to a vehicle data server (e.g., vehicle data server 104 of FIG. 1). In the example shown, the table of events is organized by road segment index (e.g., each line comprises a set of events determined to occur within the road segment associated with the road segment index). The table of events comprises hard driving events (e.g., it is determined that the driver made an unusually abrupt maneuver, possibly putting the vehicle stability in danger), out of control events (e.g., traction is lost and the vehicle begins to skid), rough road events (e.g., an extended series of small bumps is encountered), impact events (e.g., a single major impact is detected—for example, with a pothole, a curb, road debris, or other road hazard), and flat tire events (e.g., a road hazard is hit causing a tire to lose pressure). In the example shown, the events measured comprise events for a fleet of vehicles over a period of months. For a majority of road segments, there are no or very few events detected (e.g., driving is smooth and uneventful). For some road segments, only one event type is detected prominently (e.g., hard driving events in segment 1015, impact events in segment 1010). For some road segments, multiple event types are detected (e.g., impact events and flat tire events in segment 1003, impact events and out of control events in segment 1006, etc.). In some embodiments, multiple event types in a single location correspond to a single road hazard (e.g., a large pothole causes both impact events and flat tire events, a rocky road leads to both rough road events and out of control events, a road hazard leads to both impact events when the driver hits it and hard driving events when the driver takes evasive action to avoid it, etc.). In some embodiments, a warning is determined from a number of determined events (e.g., when more than a threshold number of events are detected for a road segment a warning is associated with the road segment). In some embodiments, a warning type is determined from a distribution of event types (e.g., a pothole warning is determined from impact events and flat tire events, a slow down warning is determined from out of control events, each with their own threshold, compound threshold say one for each of a number of event types, etc.). When a warning is determined for a road segment, the warning is associated with the road segment so that when a vehicle driver enters a road segment, the appropriate warning is issued. In some embodiments, a set of conditions is associated with the warning. In some embodiments, conditions are determined by determining patterns within the detected events (e.g., out of control events are determined only for vehicles above a certain weight, rough road events are determined only on rainy days, etc.).

Figure 3:
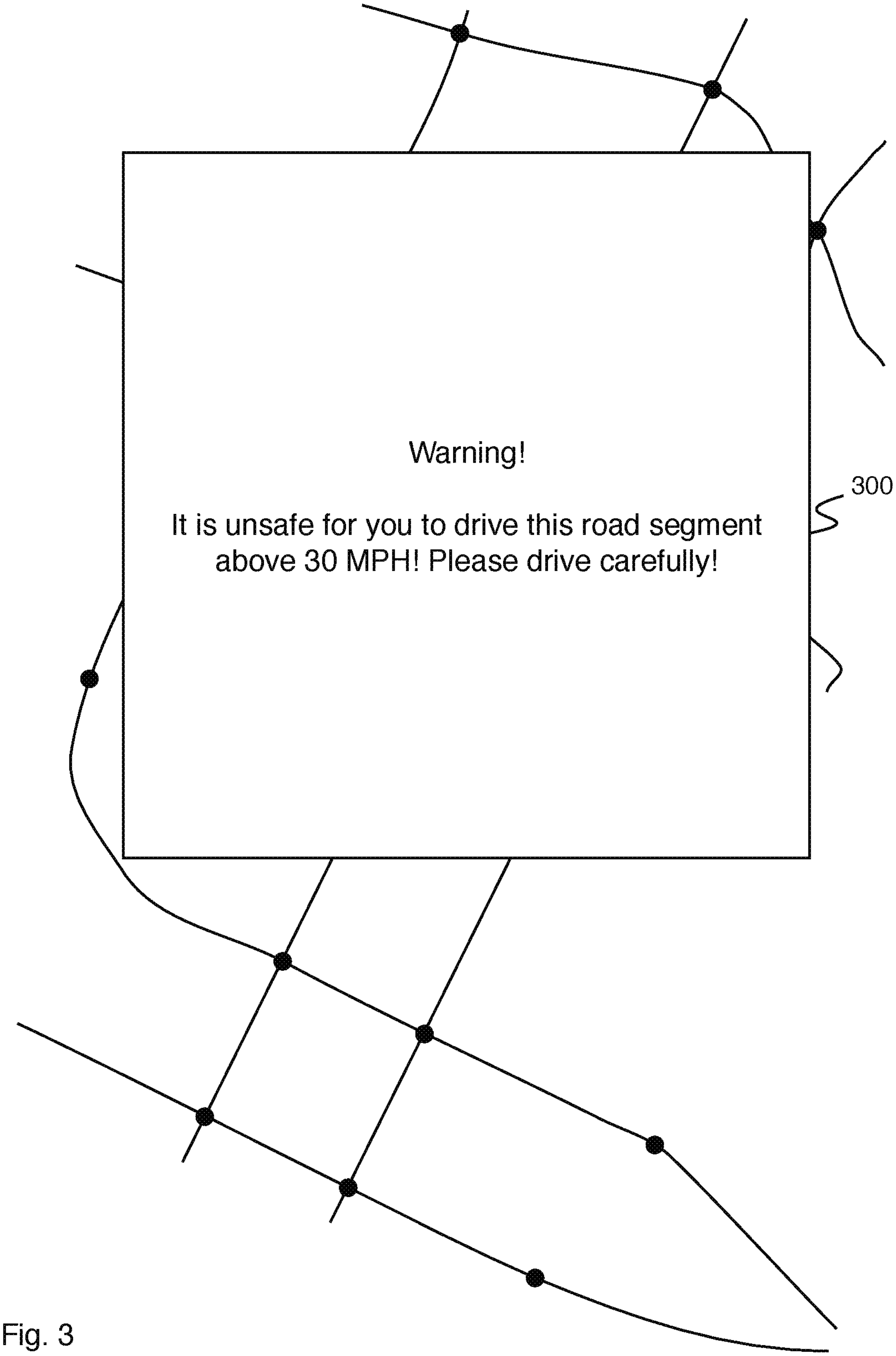
FIG. 3 is a diagram illustrating an embodiment of a warning indication.

In various embodiments, determining a warning to add to a database comprises one or more of the following:

Explicit designation by the driver through a UI either in the vehicle. For example, an in-vehicle UI could let the driver signal at the time he/she is on the segment that this particular segment is dangerous;

Explicit designation by the driver or coach through a UI at time of review. For example, the event review tool could let reviewers designate a particular segment as dangerous as well as provide reasons/classifications as to why it is dangerous; and Explicit designation by the coach or the safety manager, Client Account Manager or other participants in the program through rules and/or settings (e.g., a geofence) which segments are considered dangerous;

In various embodiments, such designations are global (apply to all drivers using the system), specific to a company or a certain group within a company, or any other appropriate designation. In various embodiments, a designation includes various parameters such as, but not limited to: road segment start/end, type of vehicle, speed, weather conditions, traffic conditions, time of the day, or any other type of parameter. In some embodiments, a setting interface enables a user to remove a warning from the database;

FIG. 3 is a diagram illustrating an embodiment of a warning indication. In some embodiments, warning 300 is associated with a road segment (e.g., a road segment as in road segment 202 of FIG. 2A). In some embodiments, warning 300 is determined from a set of events (e.g., as in the set of events shown in event table 250 of FIG. 2B). In the example shown, warning 300 comprises a warning indication that it is unsafe to drive in the road segment above 30 MPH. In some embodiments, the warning was determined based on conditions associated with the detected events (e.g., vehicle weight, vehicle speed, etc.). In the example shown, warning 300 comprises a graphical warning. In some embodiments, warning 300 comprises a graphical warning shown on an app on a mobile device. In various embodiments, a warning comprises a graphical warning, an audible warning (e.g., a buzzer), a light warning (e.g., a blinking light on a vehicle event recorder), a tactile warning (e.g., a vibration in a mobile device or in a steering wheel, etc.), or any other appropriate warning indication.

Figure 4:
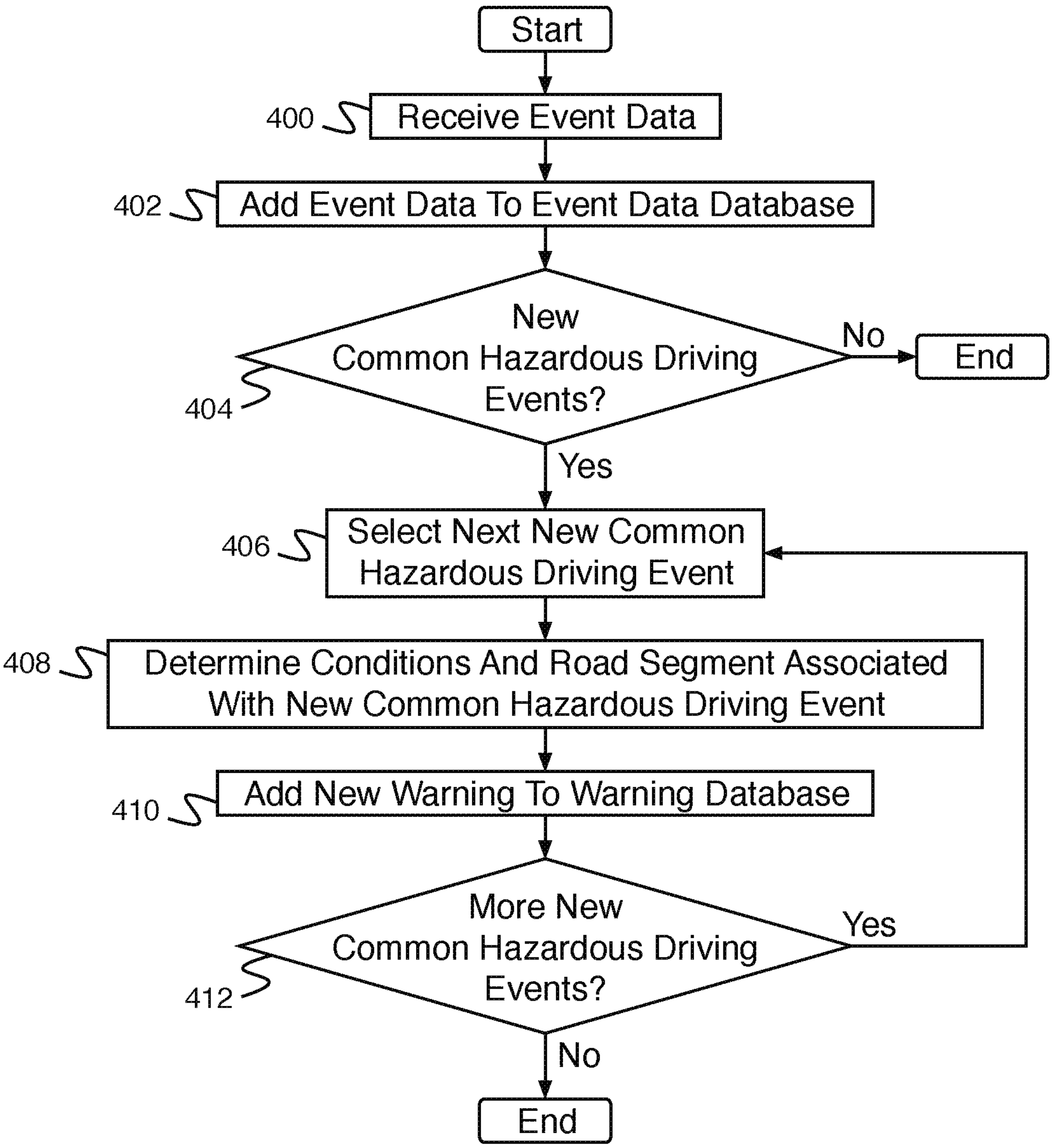
FIG. 4 is a flow diagram illustrating an embodiment of a process for determining warnings.

FIG. 4 is a flow diagram illustrating an embodiment of a process for determining warnings. In some embodiments, the process of FIG. 4 is executed by a vehicle data server (e.g., vehicle data server 104 of FIG. 1). In the example shown, in 400, event data is received (e.g., from a vehicle event recorder). In some embodiments, event data comprises data describing anomalous events and associated conditions. In 402, event data is added to an event data database. In some embodiments, an event data database comprises an event table. In some embodiments, an event data database comprises a collection of event data from one or more vehicle event recorders (e.g., from a fleet of vehicles) over a period of time. In 404, it is determined whether there are new common hazardous driving events. In various embodiments, determining whether there are new common hazardous driving events comprises determining whether there are more than a threshold number of hazardous driving events of a given type in a road segment, determining whether there are more than a threshold number (e.g., a road segment threshold number) of total driving events in a road segment, determining whether there are more than a threshold number of driving events in a road segment according to a predetermined correlation (e.g., flat tire events and impact events, etc.), determining whether a number of events of a type is greater than a threshold number of the type, determining whether a number of events associated with the road segment is greater than a road segment threshold, determining whether a number of events of a correlated set of types being greater than a correlated threshold for the set of types, or determining whether there are new common hazardous driving events in any other appropriate way. In some embodiments, each event type has a corresponding threshold. In the event it is determined that there are no new common hazardous driving events, the process ends. In the event it is determined that there are new common hazardous driving events, control passes to 406. In 406, the next new common hazardous driving event is selected. In some embodiments, the next new common hazardous driving event comprises the first new common hazardous driving event. In 408, conditions and a road segment associated with the new common hazardous driving event are determined. In some embodiments, determining conditions associated with the common hazardous driving event comprises determining whether more than a predetermined fraction of the hazardous driving events comprise common conditions (e.g., vehicle type, driver type, weather, etc.). In 410, a new warning is added to a warning database. In some embodiments, the warning is associated with the determined conditions and road segment. In 412, it is determined whether there are more new hazardous driving events. In the event that there are more new common hazardous driving events, control passes to 406. In the event that there are not more new common hazardous driving events, the process ends.

Figure 5:
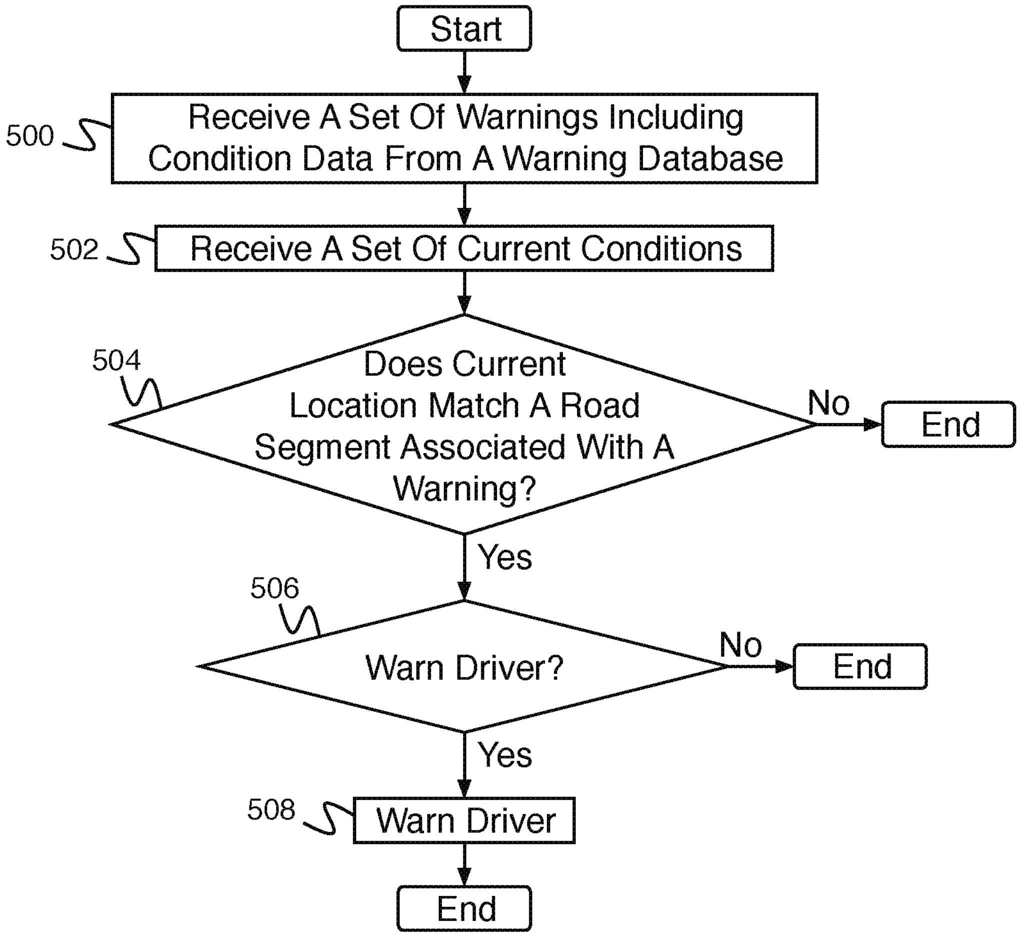
FIG. 5 is a flow diagram illustrating an embodiment of a process for warning a driver.

FIG. 5 is a flow diagram illustrating an embodiment of a process for warning a driver. In some embodiments, the process of FIG. 5 is executed by a vehicle event recorder (e.g., vehicle event recorder 102 of FIG. 1). In the example shown, in 500, a set of warnings including condition data is received from a warning database. In some embodiments, the warning database comprises a warning database stored on a vehicle data server. In some embodiments, the warning database comprises a warning database built using the process of FIG. 4. In various embodiments, a set of warnings is received once, once a month, once a day, once every time a driver begins a new shift, or with any other appropriate frequency. In 502, a set of current conditions is received. In various embodiments, a set of current conditions comprises vehicle type, driver type, weather conditions, time of day, traffic conditions, recently detected events, or any other appropriate conditions. In 504, it is determined whether the current location matches a road segment associated with a warning. For example, the current location is close to or within a location of a road segment (e.g., where close to is a position less than a threshold distance away from a set of locations associated with a road segment). In some embodiments, determining whether the current location matches a road segment associated with a warning comprises determining a road segment from a GPS measurement (e.g., determining the road segment the vehicle is currently in). In some embodiments, determining whether the current location matches a road segment associated with a warning comprises determining whether there are any warnings associated with a determined road segment. In the event that the current location does not match a road segment associated with a warning, the process ends. In the event that the current location matches a road segment associated with a warning, control passes to 506. In 506 it is determined whether to warn a driver. In some embodiments, determining whether to warn a driver is based at least in part on the warning and a set of current conditions. In some embodiments, determining whether to warn a driver comprises determining whether the set of current conditions matches condition data associated with a warning associated with the current road segment. In the event it is determined not to warn the driver, the process ends. In the event it is determined to warn the driver, control passes to 508. In 508, the driver is warned. In various embodiments the driver is warned or indicated to be warned using a graphical warning, an audible warning (e.g., a buzzer), a light warning (e.g., a blinking light on a vehicle event recorder), a tactile warning (e.g., a vibration in a mobile device or in a steering wheel, etc.), or any other appropriate warning. In various embodiments, the driver is warned or indicated to be warned using a vehicle event recorder, a mobile device, a vehicle device, or using any other appropriate warning device.

In some embodiments, an example of proactive warning comprises the following: a 3 mile segment of highway in a mountainous area is deemed dangerous by a company whose trucks have to frequently drive on this segment. The segment includes sharp curves and only very limited shoulder/buffer space between the lane and a sharp cliff. While the highway speed limit is 55 mph, tanker trucks aren't safe driving through these curves over 35 mph. A fatal accident was caused by one company tanker trucks driving at the speed limit and falling off the cliff because of the tanker content inertia. Using the system automatically sets the start and end of the highway segment on the map, the type of vehicle (tanker trucks), the type of alert and details of the alerts their drivers will receive upon approaching or entering this segment. In some embodiments, a system automatically indicates to warn a driver in the event it is determined that a warning for a driver of a specific company is driving a specific type of vehicle over a specific highway segment where a fatal incident occurred. In some embodiments, an automatic determination for a warning occurs for a fatal incident with similar conditions (e.g., vehicle or truck type, driver experience, time of day, road segment, weather type, etc.). In some embodiments, an automatic determination for a warning occurs for a serious incident (e.g., high damage incident, injury incident, police citation incident, high threshold shock incident, hard maneuver incident, etc.) with similar conditions (e.g., vehicle or truck type, driver experience, time of day, road segment, weather type, etc.).

In some embodiments, an example of proactive warning comprises the following: a surface street where the system's powered vehicles frequently drive on has a pothole that causes these vehicles to either suddenly brake or absorb a violent shock. The drivers are warned that there is such an obstacle on the road so they can be prepared and avoid the danger. In this case, the system will detect that large number of events of a certain type (e.g., a hard brake or shock due to road condition) are happening at a specific location. Once that number reaches a configured threshold the system will create an alert. All vehicles approaching or entering the segment will be warned that there is an obstacle on the road ahead and that they should slow down and be alert. In some embodiments, an automatic determination for a warning occurs for a non-fatal incident (e.g., over a threshold number of shocks, hard brakes, hard maneuvers, etc.) with similar conditions (e.g., vehicle or truck type, driver experience, time of day, road segment, weather type, etc.).

In some embodiments, an example of proactive warning comprises the following: an intersection in an urban area is such that the driver coming in a specific direction has limited visibility to incoming vehicles and pedestrian. This lack of visibility is much worse for larger vehicles. Thus a lot of collisions are happening on that intersection between 3-4 pm when traffic on the crossing road is heavy when a nearby school is out. In this case the system will be able to detect that a large number of collisions happen on this intersection at this particular time of the day. The system will create an alert for large vehicles (e.g., trucks, buses) that will warn drivers approaching the intersection between 3-4 pm that they should pay attention to incoming vehicles and children crossing the road and for instance stop vs. yield. In some embodiments, a system indicates to warn a driver in the event it is determined that a warning for a driver of a specific type of vehicle arriving at a specific location (e.g., an intersection) between a start time and an end time. In some embodiments, an automatic analysis detects a cluster of events (e.g., greater than a number of events with similar conditions—e.g., greater than 2, 3, 4, 5, 6, 10, 12, events with the same vehicle, the same weather, the same time of day, the same location, the same traffic conditions, etc.) and indicates to store a warning in a database for the conditions and location.

Figure 6:
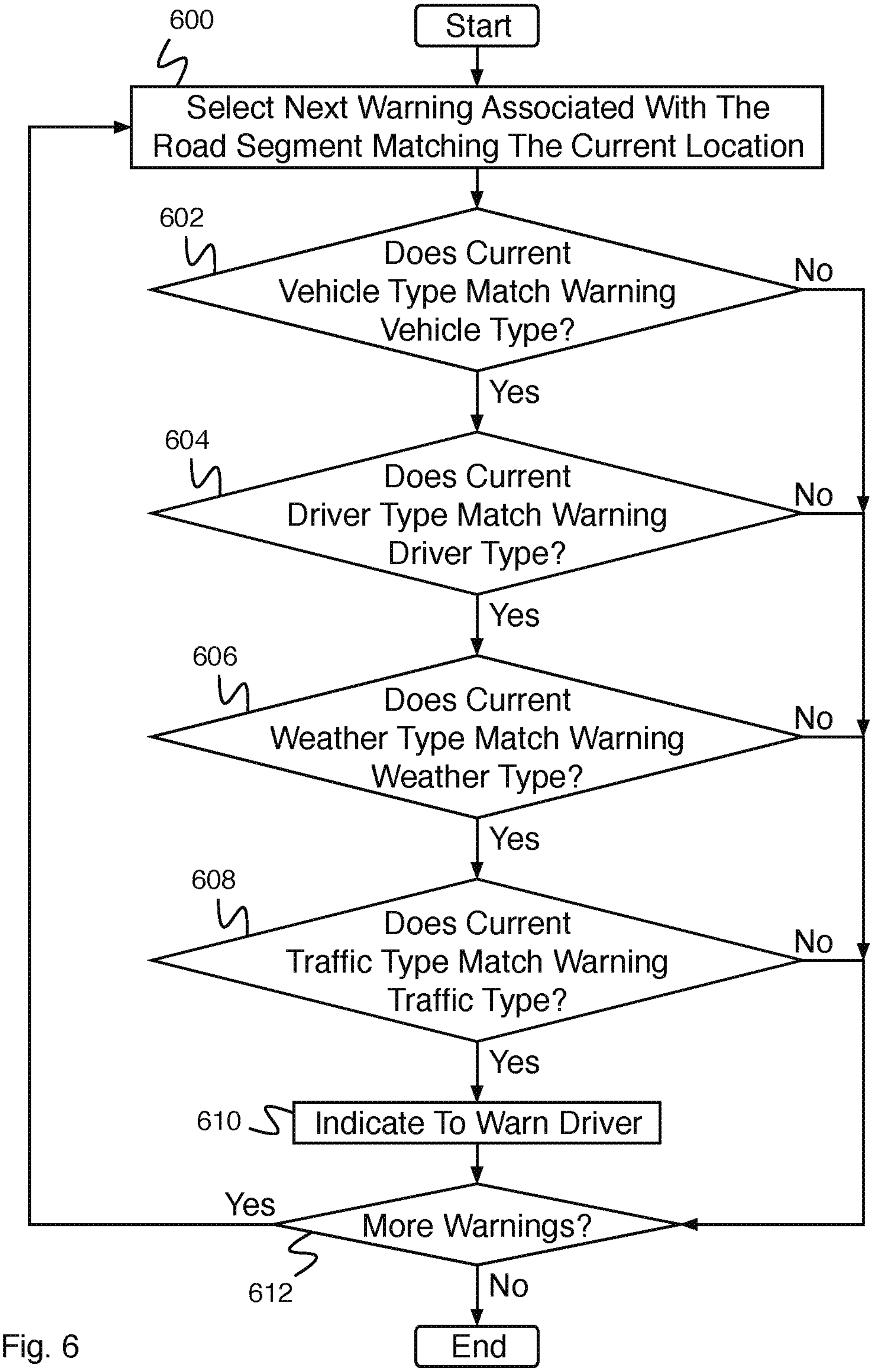
FIG. 6 is a flow diagram illustrating an embodiment of a process for determining whether to warn a driver.

FIG. 6 is a flow diagram illustrating an embodiment of a process for determining whether to warn a driver. In some embodiments, the process of FIG. 6 implements 506 of FIG. 5. In the example shown, in 600, the next warning associated with the road segment matching the current location is selected. In some embodiments, the next warning associated with the road segment matching the current location comprises the first warning associated with the road segment matching the current location. In 602, it is determined whether the current vehicle type (e.g., the vehicle type of a set of current conditions) matches the warning vehicle type (e.g., the vehicle type associated with the warning). In various embodiments, vehicle type comprises vehicle size (e.g., passenger car, pickup truck, delivery truck, heavy truck, etc.), vehicle weight, vehicle number of axles, or any other appropriate vehicle type information. In the event it is determined that the current vehicle type does not match the warning vehicle type, control passes to 612. In the event it is determined that the current vehicle type matches the warning vehicle type, control passes to 604. In 604, it is determined whether the current driver type (e.g., the driver type of a set of current conditions) matches the warning driver type (e.g., the driver type associated with the warning). In various embodiments, driver type comprises average driver, aggressive driver, conservative driver, frequent speeder, or any other appropriate driver type. In the event it is determined that the current driver type does not match the warning driver type, control passes to 612. In the event it is determined that the current driver type matches the warning driver type, control passes to 606. In 606, it is determined whether the current weather type (e.g., the weather type of a set of current conditions) matches the warning weather type (e.g., the weather type associated with the warning). In various embodiments, weather type comprises normal, raining, windy, hailing, snowing, or any other appropriate weather type. In the event it is determined that the current weather type does not match the warning weather type, control passes to 612. In the event it is determined that the current weather type matches the warning weather type, control passes to 608. In 608, it is determined whether the current traffic type (e.g., the traffic type of a set of current conditions) matches the warning traffic type (e.g., the traffic type associated with the warning). In various embodiments, traffic type comprises light, moderate, heavy, stopped, fast moving, or any other appropriate traffic type. In the event it is determined that the current traffic type does not match the warning traffic type, control passes to 612. In the event it is determined that the current traffic type matches the warning traffic type, control passes to 610. In 610, the process indicates to warn the driver. In 612, it is determined whether there are more warnings. In some embodiments, determining whether there are more warnings comprises determining whether there are more warnings associated with the road segment matching the current location. In the event it is determined that there are more warnings associated with the road segment matching the current location, control passes to 600. In the event it is determined that there are not more warnings associated with the road segment matching the current location, the process ends.

Figure 7:
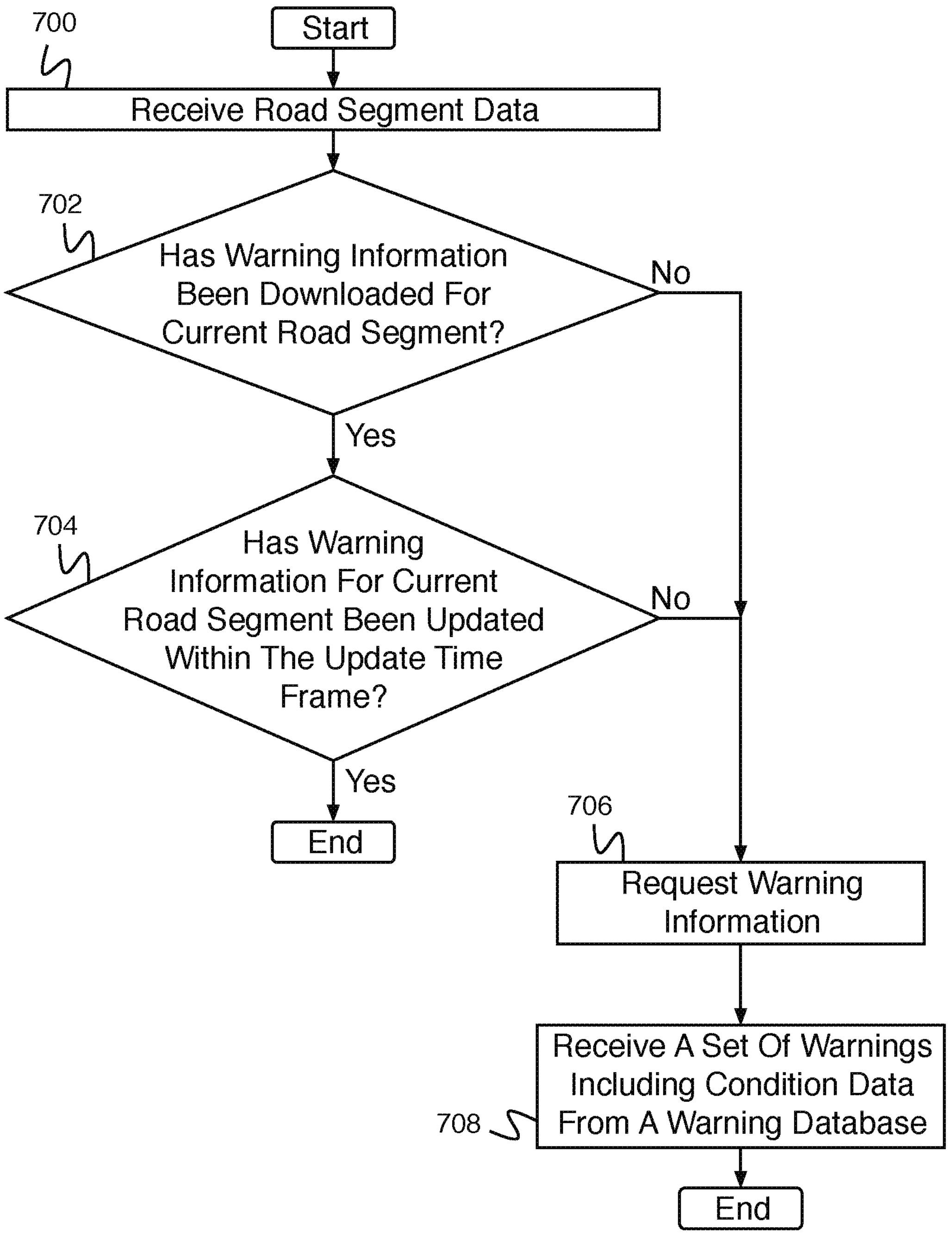
FIG. 7 is a flow diagram illustrating an embodiment of a process for receiving a set of warnings including condition data from a warning database.

FIG. 7 is a flow diagram illustrating an embodiment of a process for receiving a set of warnings including condition data from a warning database. In some embodiments, the process of FIG. 7 implements 500 of FIG. 5. In the example shown, in 700, road segment data is received. In some embodiments, receiving road segment data comprises determining location information (e.g., using a GPS) and determining road segment information from the location information (e.g., using a lookup table, a map, etc.). In 702, it is determined whether warning information has been downloaded for the current road segment. In the event it is determined that warning information has not been downloaded for the current road segment, control passes to 706. In the event it is determined that warning information has been downloaded for the current road segment, control passes to 704. In 704 it is determined whether warning information for the current road segment has been updated within the update time frame. In various embodiments, the update time frame comprises one hour, eight hours, one day, one week, one month, or any other appropriate update time frame. In the event it is determined that the warning information has been updated within the update time frame, the process ends. In the event it is determined that warning information has not been updated within the update time frame, control passes to 706. In 706, warning information is requested (e.g., from a vehicle data server). In 708, a set of warnings including condition data is received from a warning database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating a set of warnings regarding a vehicle, comprising:
- receiving event data, wherein the event data is recorded by a vehicle event recorder;
- determining a common hazard based on the event data meeting a threshold, including:
  - identifying a driving event based on the received event data,
  - determining a type of the driving event,
  - determining that a number of driving events of a type meets a second threshold, and
  - determining the common hazard responsive to the determination that the number of driving events of a type meet the second threshold, the type of driving event including a hard driving event, the hard driving event being characterized by a change in stability of the vehicle;
- responsive to the determination of the hazard, determining at least one condition based at least in part on determining whether more than a threshold fraction of hazardous events comprise common conditions;
- responsive to the determination of the hazard, determining at least one road segment associated with the hazard;
- generating a warning regarding the hazard;

adding the warning to the set of warnings based on an association between (i) at least one of: the at least one condition and the at least one road segment and (ii) the set of warnings; and outputting the set of warnings.

2. The method of claim 1, wherein the change in stability of the vehicle includes an abruptness of the change in stability of the vehicle being above a third threshold.

3. The method of claim 1, wherein the type of driving event includes a management event, the management event being characterized by a level of control of the vehicle by a driver.

4. The method of claim 1, wherein the type of driving event includes a management event, the management event being characterized by a level of traction of the vehicle meeting a fourth threshold.

5. The method of claim 1, wherein the type of driving event includes a rough road event, the rough road event being characterized by a magnitude of a bump experienced by the vehicle.

6. The method of claim 1, wherein the type of driving event includes a rough road event, the rough road event being characterized by a number of bumps experienced by the vehicle, the bump being identified by a degree of translation and/or rotation meeting a fifth threshold.

7. The method of claim 1, wherein the type of driving event includes an impact event, the impact event being characterized by a magnitude of contact with a feature of a road meeting a sixth threshold.

8. The method of claim 1, wherein the type of driving event includes an impact event, the impact event being characterized by a contact by the vehicle with a defect in a road.

9. The method of claim 1, wherein the type of driving event includes a tire event, the tire event being characterized by a pressure in at least one tire of the vehicle meeting a seventh threshold.

10. The method of claim 1, wherein the type of driving event includes a tire event, the tire event being characterized by a flat tire.

11. The method of claim 1, wherein the determination of the hazard:

includes identifying a driving event based on the received event data; and is based on a number of driving events meeting an eighth threshold.

12. The method of claim 1, wherein the determination of the hazard:

includes identifying a driving event based on the received event data; and is based on a number of driving events meeting a ninth threshold for a road segment.

13. The method of claim 1, wherein the determination of the hazard:

includes identifying a driving event based on the received event data and determining a type of the driving event; and is based on a distribution of driving event types meeting a profile.

14. The method of claim 1, wherein the determination of the hazard:

includes identifying a driving event based on the received event data and determining a type of the driving event; and is based on a number of events of a correlated set of event types meeting a threshold for the set of event types.

15. The method of claim 1, wherein the determination of the hazard includes determining that the hazard is a pothole based on a number of impact events meeting a tenth threshold and a number of flat tire events meeting an eleventh threshold.

16. The method of claim 1, further comprising:

storing the event data to an event storage, wherein the event storage stores event data from a plurality of vehicles.

17. A system for generating a set of warnings regarding a vehicle, comprising:

a processor to:

receive event data, wherein the event data is recorded by a vehicle event recorder;

determine a common hazard based on the event data meeting a threshold, including:

identify a driving event based on the received event data, determine a type of the driving event, determine that a number of driving events of a type meets a second threshold, and determine the common hazard responsive to the determination that the number of driving events of a type meet the second threshold, the type of driving event including a hard driving event, the hard driving event being characterized by a change in stability of the vehicle;

responsive to the determination of the hazard, determine at least one condition based at least in part on determining whether more than a threshold fraction of hazardous events comprise common conditions;

responsive to the determination of the hazard, determine at least one road segment associated with the hazard;

generate a warning regarding the hazard;

add the warning to the set of warnings based on an association between (i) at least one of: the at least one condition and the at least one road segment and (ii) the set of warnings; and output the set of warnings; and a memory coupled to the processor and configured to provide the processor with instructions, wherein the event data is stored to the memory.

18. A computer program product for generating a set of warnings regarding a vehicle, the computer program product being embodied in a non-transitory computer readable storage medium and comprising computer instructions for:

receiving event data, wherein the event data is recorded by a vehicle event recorder;

determining a common hazard based on the event data meeting a threshold, including:

identifying a driving event based on the received event data, determining a type of the driving event, determining that a number of driving events of a type meets a second threshold, and determining the common hazard responsive to the determination that the number of driving events of a type meet the second threshold, the type of driving event including a hard driving event, the hard driving event being characterized by a change in stability of the vehicle;

responsive to the determination of the hazard, determining at least one condition based at least in part on determining whether more than a threshold fraction of hazardous events comprise common conditions;

responsive to the determination of the hazard, determining at least one road segment associated with the hazard;

generating a warning regarding the hazard;

adding the warning to the set of warnings based on an association between (i) at least one of: the at least one condition and the at least one road segment and (ii) the set of warnings; and outputting the set of warnings.

* * * * *